United States Patent [19]

Tatum

[11] Patent Number: 5,251,914
[45] Date of Patent: Oct. 12, 1993

[54] SEALING ASSEMBLY FOR RELATIVELY MOVABLE MEMBERS

[76] Inventor: David M. Tatum, 9251 Burdine, No. 386, Houston, Tex. 77096

[21] Appl. No.: 690,149

[22] Filed: Apr. 23, 1991

Related U.S. Application Data

[63] Continuation-in-part of Ser. No. 227,624, Aug. 3, 1988, Pat. No. 5,009,579, and a continuation-in-part of Ser. No. 55,126, May 28, 1987, Pat. No. 4,762,189.

[51] Int. Cl.$^5$ .................. F16J 15/38; F16C 33/76
[52] U.S. Cl. ................... 277/123; 277/86; 277/87; 277/92; 384/91; 175/371; 175/372
[58] Field of Search .............. 277/92, 123, 82, 83, 277/85, 86, 87, 96.2, 84, 96.1, 96; 384/92, 94; 175/371, 372; 251/214

[56] References Cited

U.S. PATENT DOCUMENTS

| | | | |
|---|---|---|---|
| 1,884,965 | 10/1932 | Baggett et al. | 384/94 |
| 2,075,444 | 3/1937 | Koehring | 277/96.2 X |
| 2,110,098 | 3/1938 | Strecker | 277/123 |
| 2,425,209 | 8/1947 | Snyder et al. | 277/96.2 |
| 2,432,576 | 12/1947 | Koffer | 277/92 X |
| 3,004,807 | 10/1961 | Kniepkamp | 277/92 X |
| 3,097,823 | 7/1963 | Kaiser | 251/214 |
| 3,584,886 | 6/1971 | Simpson et al. | 277/92 |
| 3,779,565 | 12/1973 | Witte | 277/235 R X |
| 4,087,099 | 5/1978 | Kurio | 277/92 X |
| 4,429,854 | 2/1984 | Kar et al. | 384/94 |
| 4,451,047 | 3/1984 | Herd et al. | 277/123 X |
| 4,510,966 | 4/1985 | Parsons, Jr. | 251/214 X |
| 4,516,641 | 5/1985 | Burr | 384/94 X |
| 4,535,803 | 8/1985 | Price | 251/214 X |
| 4,540,012 | 9/1985 | Bridges | 251/214 |
| 4,762,189 | 8/1988 | Tatum | 277/92 X |
| 4,819,999 | 4/1989 | Livesay | 277/96.2 X |
| 5,005,989 | 4/1991 | Karlsson | 384/91 |
| 5,009,519 | 4/1991 | Tatum | 277/92 X |

FOREIGN PATENT DOCUMENTS 1036873 7/1966 United Kingdom .................. 277/86

*Primary Examiner*—William A. Cuchlinski, Jr.
*Assistant Examiner*—James K. Folker
*Attorney, Agent, or Firm*—Neal J. Mosely

[57] ABSTRACT

A sealing assembly for relatively movable, e.g., rotating or reciprocating, members with a plurality of surfaces defining an annular space having a longitudinal axis, at temperatures up to about 1000° F., comprises first and second annular rings of a hard, material having low frictional properties. Each of the annular rings has a radially extending wall and an axially extending wall defining an annular seal gland when fitted together and has external surfaces facing longitudinally outward relative to the longitudinal axis and external surfaces facing outward and inward radially of the longitudinal axis adapted to fit the surfaces of the annular space and of the relatively movable members. The annular rings have surfaces facing inwardly toward each other when assembled shaped to form an annular cavity. An annular elastic metal spring is positioned in the annular cavity between and at least partially surrounded on all sides by the annular rings and spaced from the surfaces of the annular space and the relatively movable members biasing the annular rings apart in directions both radially and longitudinally of the longitudinal axis when installed with the annular members under compression toward each other.

40 Claims, 4 Drawing Sheets

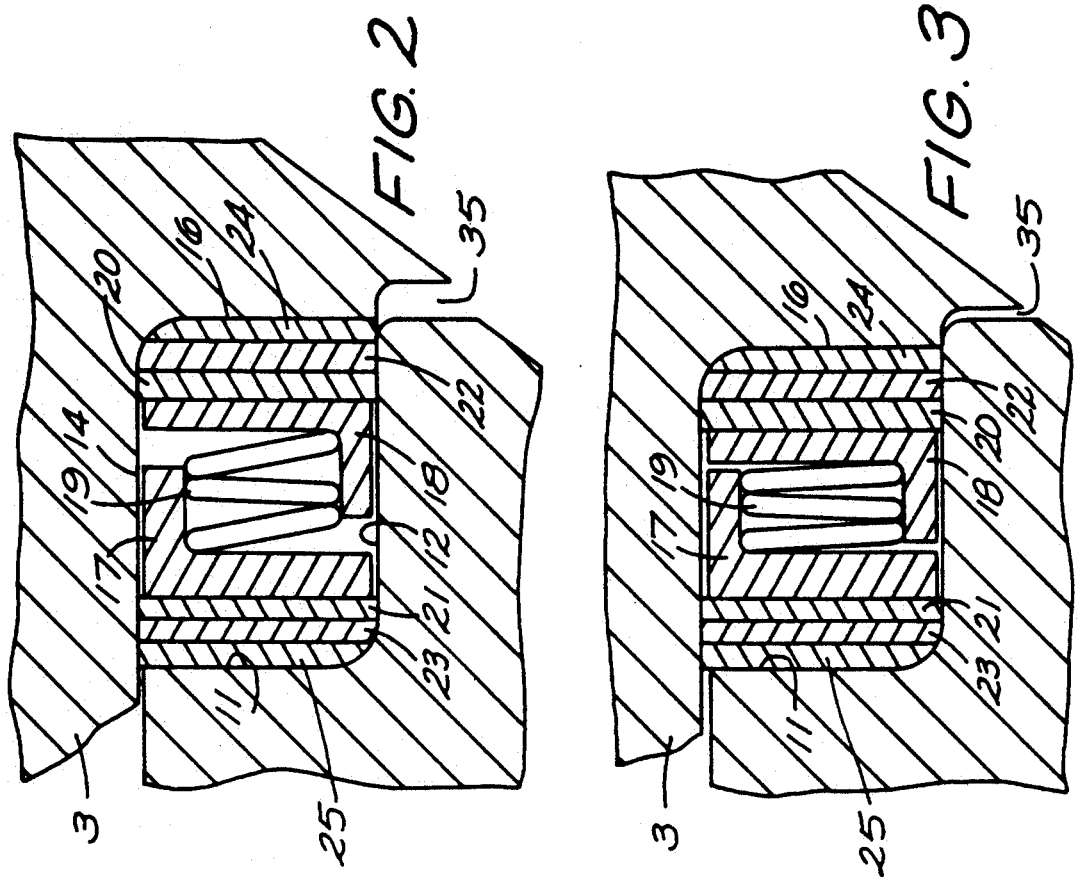
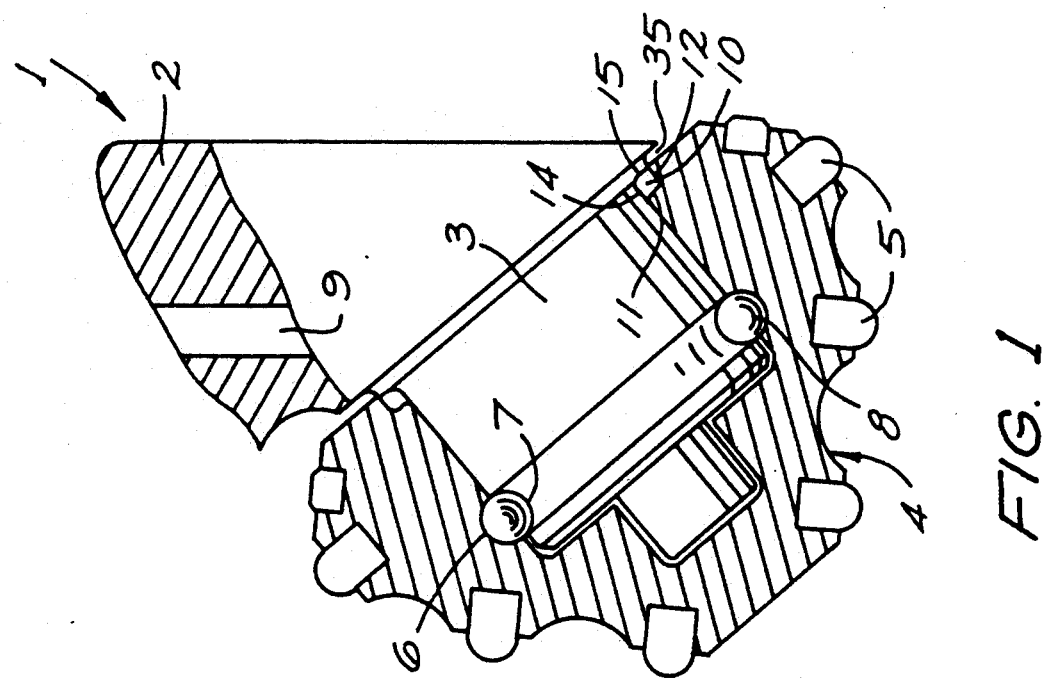

SEALING ASSEMBLY FOR RELATIVELY MOVABLE MEMBERS

CROSS REFERENCE TO RELATED APPLICATION

This application is a continuation-in-part of co-pending U.S. application Ser. No. 227,624, filed, Aug. 3, 1988, now U.S. Pat. No. 5,009,579, issued Apr. 23, 1991, a continuation-in-part of co-pending U.S. application Ser. No. 55,126 filed, May 28, 1987, now U.S. Pat. No. 4,762,189, issued Aug. 9, 1988

BACKGROUND OF THE INVENTION

1. Field of the Invention

This invention relates generally to a sealing member for relatively movable, e.g., rotating or reciprocating, members and more particularly to improved seal assemblies for use at high temperatures.

2. Brief Description of the Prior Art

Seal assemblies for use in applications involving a sliding, rotating or static journal member in a sleeve housing are in common use. As the seal assemblies often function in dynamic circumstances with differential pressure applied to the assemblies much effort has been directed to development and improvement of seal assemblies. The invention disclosed is applicable to a variety of industrial applications.

PRIOR ART PATENTS

Galle, U.S. Pat. No. 3,361,499 discloses an O-ring seal. Rife, U.S. Pat. No. 4,194,795 discloses the O-ring structure with a TEFLON shield located within the seal gland to retard shale from reaching and destroying the O-ring.

Crow, U.S. Pat. No. 4,277,109, Oelke, U.S. Pat. No. 4,344,629, and Evans, et al, U.S. Pat. No. 4,452,539 disclose variations of the O-ring seal. Deane, et al, U.S. Pat. No. 4,466,622 discloses static elastomers supporting metal seal plates in lieu of dynamic O-rings.

The seal assemblies using dynamic O-rings are subject to the foregoing and other problems. The Deane patent allows contaminants into the seal gland causing abrasion and ultimate failure of the seal.

Applicant's U.S. Pat. No. 4,762,189 discloses a seal and seal shield assembly which is compression-loaded in an annular cavity to hold lubricant in the bit and protect against abrasive debris and a sealing member which comprises a pair of annular rings each with a radially extending wall and an axially extending wall defining an annular seal gland. An elastic rubber spring member compression-loaded in the seal biases the exterior surfaces against the bearing surfaces. The ring members are preferably of TEFLON, or like polytetrafluoroethylene plastic, or a soft elastic metal capable of being compressed by the spring member against the walls of the surface being sealed. The spring is a rubber or elastomeric O-ring or the like.

Applicant's U.S. patent application Ser. No. 227,624, filed, Aug. 3, 1988, now U.S. Pat. No. 5,009,579, issued Apr. 23, 1991, discloses a novel sealing member for rotating or reciprocating members which comprises a pair of annular rings each with a radially extending wall and an axially extending wall defining an annular seal gland. An elastic spring member compression-loaded in the seal biases exterior surfaces against the bearing surfaces. The ring members are preferably of a hard, but elastically deformable material having low frictional properties capable of being compressed by the spring member against the walls of the surface being sealed. The spring is a Belleville spring assembly or the like, and is characterized by its operation at elevated temperatures.

SUMMARY OF THE INVENTION

One of the objects of the invention is to provide an improved seal and seal shield assembly for rotary or reciprocating members for high temperature applications and/or high pressure differentials.

Another object of the invention is to provide a seal and seal shield assembly for a rotating, sliding or static, i.e. relatively movable, journal member within a sleeve housing for high temperature applications and/or high pressure differentials.

Still another object of the invention is to provide a seal and seal shield assembly to provide high positive pressure to the bearing surfaces to be sealed for high temperature applications and/or high pressure differentials or vacuum sealing.

Still another object of the invention is to provide a seal and seal shield assembly with chemically inert contact surfaces for high temperature applications and/or high pressure differentials or vacuum sealing.

Yet another object of the invention is to provide a seal and seal shield assembly with contact surfaces of self-lubricating materials for high temperature applications and/or high pressure differentials or vacuum sealing.

It is a further object of the invention to provide a seal assembly having a pair of annular rings with a radially extending wall and an axially extending wall forming an annular seal gland, with an elastic metal spring member compression-loaded in the seal biasing the exterior surfaces against the bearing surfaces for high temperature applications and/or high pressure differentials or vacuum sealing.

Other objects of the invention will become apparent from time to time throughout the specification and claims as hereinafter related.

The above noted and other objects of the invention are accomplished by a sealing member for relatively movable members having a pair of annular rings with a radially extending wall and an axially extending wall forming an annular seal gland. An elastic metal Belleville spring member compression-loaded in the seal biases exterior surfaces against the bearing surfaces. The ring members are of a hard, but elastically deformable material with low frictional properties capable of being compressed by the spring member against the walls of the surface being sealed.

BRIEF DESCRIPTION OF THE DRAWINGS

FIG. 1 is an axial sectional view of a roller cone rock bit journal and cutter cone assembly showing the seal and seal shield assembly location.

FIG. 2 is an axial sectional view of a seal assembly with a seal shield prior to compression-loading of the seal and seal shield assembly.

FIG. 3 is an axial sectional view of a seal assembly subsequent to compression-loading of the seal and seal shield assembly.

DESCRIPTION OF ONE PREFERRED EMBODIMENT

Figure 4:
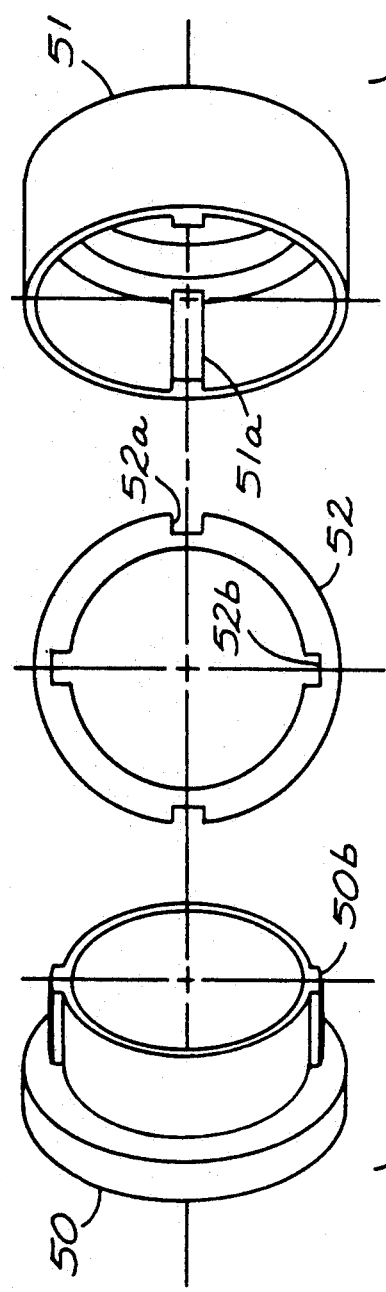
FIG. 4 is an exploded view of the spring assembly of this invention.

Referring to the drawings by numerals of reference, in FIG. 1 there is shown a portion of a drill bit 1 having a body (not fully shown) with a leg portion 2 with a spindle or journal 3, and a cutter cone assembly 4. The drill bit is a conventional roller cone drill bit used for drilling rock and earth formations. Rotary drill bits of this general type comprise a bit body (not shown) threadedly connected to a drill string member (not shown), the bit body having multiple legs, a portion of a typical leg 2 being shown in FIG. 1.

Roller cone cutter 4 is rotatably mounted on the journal 3 and has a plurality of inserts 5 for crushing rock and other materials in drilling. Various bearing assemblies (not shown), including friction bearings, roller bearings, and ball bearings, may be located in the bearing area between the cutter cone 4 and the journal 3.

The embodiment shown has a non-loaded, ball bearing assembly comprising a cutter cone ball bearing race 6, a journal ball bearing race 7, and a multiplicity of retainer balls 8, which are not loaded but function to retain the cone cutter 4 on the journal 3.

Each leg includes a lubrication system comprising a reservoir (not shown) located in the upper portion thereof. The reservoir communicates with a lubrication passage 9 which is connected with a multiplicity of passages in the journal to provide lubricant to the various bearing assemblies.

The seal and seal shield assembly 15 of the present invention is positioned between the cone cutter 4 and the journal 3 in the annular seal cavity 10. The annular seal cavity 10 is defined by the cutter cone seal thrust face 11, the cone cutter seal bearing surface or cutter side 12, the journal seal thrust surface or journal end bearing surface 16, and the journal seal bearing surface 14. The journal seal thrust surface 16 and the journal seal bearing surface or journal peripheral surface 14 are integrally connected and form fixed walls of the annular seal cavity 10, the journal seal thrust surface 16 representing a flange surface in relation to the journal 3. The cone cutter seal thrust face 11 and the cone cutter seal bearing surface 12 are integrally connected, the said surfaces being formed by an annular recess in the open end of the axial bore of the cone cutter 4.

The seal and seal shield assembly 15 (not shown in FIG. 1) is located in the annular seal cavity 10 to retain lubricant in the bearing area between the cutter cone 4 and the journal 3 and to prevent debris in the well bore from entering the bearing area. In FIG. 2, the seal and seal shield assembly 15 of the present invention is shown in the annular seal cavity 10 in a relaxed condition prior to compression-loading. A portion of the cone cutter 4 is depicted in close relationship to a portion of the journal 3.

The seal and seal shield assembly 15 comprises an inner seal ring 17 (a flexibly rigid material, preferably having lubricating properties (having low frictional properties, i.e., low surface friction), e.g. an elastic, lubricating metal, e.g., lead, gold, platinum, copper, aluminum, tin, zinc, silver or alloys), an outer seal ring 18 (a flexibly rigid material, preferably having lubricating properties (having low frictional properties, i.e., low surface friction), e.g., an elastic, lubricating metal, e.g., lead, gold, platinum, or silver or alloys), or TEFLON, PTFE, an annular spring member 19 (a metallic spring e.g., a Belleville washer assembly), seal shield wiper rings 20 and 21, seal shield stiffener rings 22 and 23, and seal shield extrusion rings 24 and 25.

Inner seal ring 17 is cylindrical with an L-shaped cross section. Inner seal ring 17 engages journal bearing surface 14, seal shield wiper ring 21, and spring member 19. Seal shield wiper ring 21, seal shield stiffener ring 23, and seal shield extrusion ring 25 are positioned between inner seal ring 17 and cone cutter seal surface 11.

Outer seal ring 18 is cylindrical with an L-shaped cross section. Outer seal ring 18 engages cutter seal surface 12, seal shield wiper ring 20, and spring member 19. Seal shield wiper ring 20, seal shield stiffener ring 22, and seal shield extrusion ring 24 are positioned between outer seal ring 18 and journal seal thrust surface 16.

Annular Belleville spring member 19 is compressed between inner seal ring 17 and outer seal ring 18. The surfaces of seal rings 17 and 18 which engage surfaces 12, 14, 20 and 21 are considered to be facing radially and axially outward relative to the inner space occupied by Belleville spring member 19. Likewise, the inner surfaces of seal rings 17 and 18 are considered to be facing radially and axially inward relative to the inner space occupied by Belleville spring member 19.

Seal wiper ring 20 (preferably formed of a malleable material having lubricating properties and resistant to corrosion e.g., lead, gold, platinum, copper, zinc, tin or silver or alloys) or TEFLON, has a flat rectangular cross-section and is positioned against outer seal ring 18 with its inner radial surface against the journal seal bearing surface 14 and outer radial surface against the cone cutter seal surface 12.

Seal shield stiffener ring 22 (preferably formed of a rigid abrasion and corrosion-resistant, ferrous material e.g., steel or a non-ferrous material e.g., beryllium-copper, graphite or high temperature plastic) having a flat rectangular cross-sectional configuration is positioned against seal wiper ring 20 with its inner radial surface located against journal seal bearing surface 14 and its outer radial surface located against cone cutter seal surface 12.

Extrusion ring 24, with a flat rectangular cross-sectional configuration, is located against seal shield stiffener ring 22 with its inner radial surface located against journal seal bearing surface 14 and its outer radial surface located against the cone cutter seal surface 12 and with the other axial surface located against the journal seal thrust surface 16.

The extrusion ring 24 is formed of a malleable material having lubricating properties and resistant to corrosion e.g., lead, gold, platinum, copper, aluminum, zinc, tin or silver or alloys or TEFLON.

Seal wiper ring 21 (preferably formed of a malleable material having lubricating properties and resistant to corrosion e.g., lead, gold, platinum, copper, aluminum, zinc, tin or silver or alloys or TEFLON), has a flat rectangular cross-section and is positioned against inner seal ring 17 with its inner radial surface against the journal seal bearing surface 14 and outer radial surface against the cone cutter seal surface 12.

Seal shield stiffener ring 23 (preferably formed of a rigid abrasion and corrosion-resistant, ferrous material e.g., steel or a non-ferrous material e.g., beryllium-copper, graphite or high temperature plastic) having a flat rectangular cross-sectional configuration is positioned against seal wiper ring 21 with its inner radial surface located against journal seal bearing surface 14 and its outer radial surface located against cone cutter seal surface 12.

Extrusion ring 25, with a flat rectangular cross-sectional configuration, is located against seal shield stiffener ring 23 with its inner radial surface located against the journal seal bearing surface 14 and its outer radial surface located against the cone cutter seal surface 12 and with the other axial surface located against the end surface 11.

The extrusion ring 25 is formed of a malleable material having lubricating properties and resistant to corrosion e.g., lead, gold, platinum, copper, aluminum, zinc, tin or silver or alloys or TEFLON. Lead is additionally desirable in rock bit applications as it is chemically inert and not subject to corrosion by hydrogen sulfide and other chemicals that may be encountered. A thermoplastic material, such as TEFLON alloys (or equivalent high-temperature lubricating plastic) may also be used for extrusion ring 25.

In FIG. 2, the seal and seal shield assembly 15 of the present invention is shown partially installed. A plurality of Belleville spring washers 19 are shown in their initial undeformed state. The number of spring washers 19 used is dependent on the size of the seal cavity and the amount of spring force required on the seal assembly. Axial compressive forces are applied to the seal and seal shield assembly 15 by the cone cutter seal thrust surface 11 and the journal seal thrust surface 16 as the cutter is assembled on the journal and compressed.

In FIG. 3, the seal and seal shield assembly 15 of the present invention is shown fully installed. Spring member 19 is shown fully compressed and biases seal rings 17 and 18 against journal seal bearing surface 14, the cone cutter seal bearing surface 12 and the seal shield wiper rings 20 and 21.

Seal wiper rings 20 and 21 are biased against seal shield stiffener rings 22 and 23, the seal shield stiffener ring 22 and 23 against seal shield extrusion rings 24 and 25, and the seal shield extrusion rings 24 and 25 against thrust faces 11 and 16. In installed configuration, therefore, seal and seal shield assembly 15 is biased against all surfaces defining the annular seal cavity 10.

In dynamic operation, the load applied to the seal and seal shield assembly 15 deforms malleable seal shield wiper rings 20 and 21 and malleable seal shield extrusion rings 24 and 25 extruding portions of wiper rings 20 and 21 and extrusion rings 23 and 24 into any voids that may occur at adjacent contact surfaces. This extrusion eliminates voids at the interfaces of seal shield members and their adjacent contacted surfaces, and material from the extrusion rings 24 and 25 is slowly extruded into outer annular space preventing the entrance of particulate matter and other foreign materials into the annular seal cavity 10.

The Belleville spring member 19 remains relatively static in relation to the inner seal ring 17 and the outer seal ring 18 under all conditions. It is therefore not subject to deterioration due to dynamic stresses. Furthermore, Belleville spring member 19 is protected from contaminants and from chemical attack by inner seal ring 17, outer seal ring 18, seal wiper rings 20 and 21, seal shield stiffener ring 22 and 23 and seal shield extrusion rings 24 and 25.

From the foregoing description it may be seen that the present seal and seal shield assembly 15 provides an efficient seal between the journal 3 and the cone cutter 4 retaining lubricating film within the bearing area between the journal 3 and the cone cutter 4 and preventing the entry of drilling debris. Seal and seal shield assembly 15 is effective for high temperature operation, i.e., up to 1000° F. and high pressure differentials

MULTIPLE SEAL AND SEAL SHIELD ASSEMBLIES

Figure 5:
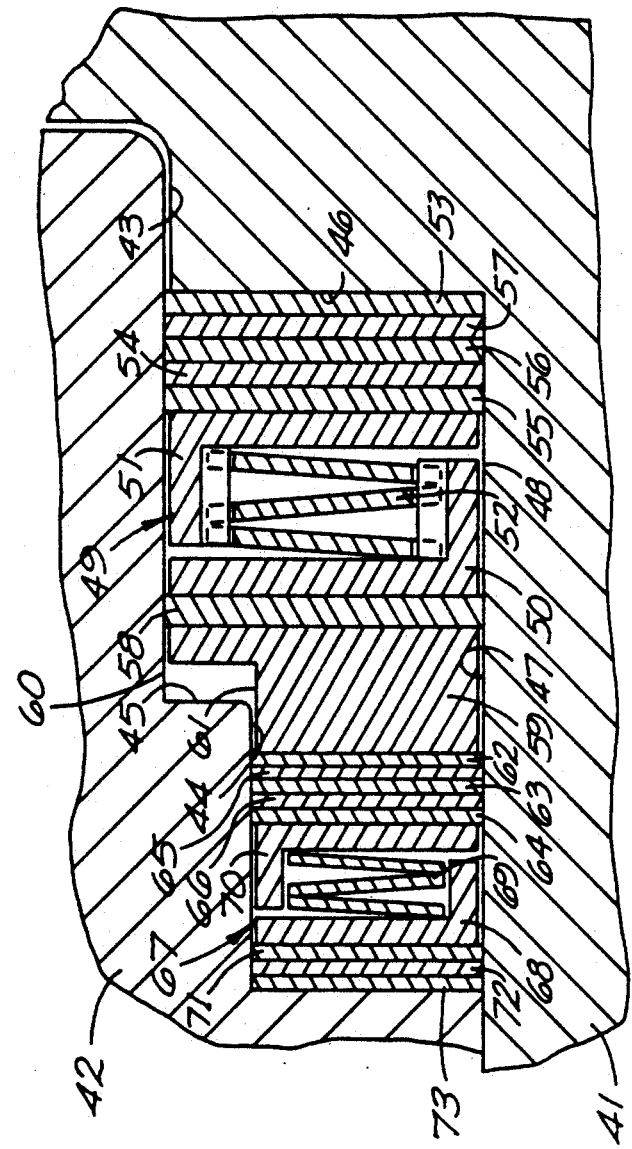
FIG. 5 is a sectional view of an embodiment of the invention having a plurality of contiguous seal assemblies.

In FIG. 5, there is shown another embodiment of the invention which illustrates the installation of multiple seal and seal shield assemblies in a contiguous configuration. A journal 41 or the like and a relatively movable member 42 are shown in cross-sectional view. Member 42 has a bore 44 and counterbore 43 with a shoulder 45 therebetween.

The seal and seal shield assembly of this embodiment comprises separate seal and seal shield assemblies assembled in spaced longitudinal relation between relatively movable members 41 and 42 in the annular seal cavities. One annular seal is defined by shoulder 45, body seal bearing surface 46, journal seal surface 47, and the surface of counterbore 43. The body seal surface 46 and the journal seal surface 47 are part of journal 41.

The seal and seal shield assembly 49 is located in the first annular seal cavity 48 to retain lubricant in the bearing area between rotary member 42 and journal 41 and to prevent debris from entering the bearing area. In FIG. 5, the seal and seal shield assembly 49 is shown in the annular seal cavity 48 in a relaxed condition prior to compression-loading (as in FIG. 2). A portion of relatively movable members 41 and 42 is shown in close relationship.

The seal and seal shield assembly 49 comprises inner seal ring 50 (a flexibly rigid material having lubricating properties, e.g., an elastic, lubricating material, e.g., lead, gold, platinum, copper, aluminum, zinc, tin or silver or alloys or TEFLON), outer seal ring 51 (a flexibly rigid material having lubricating properties, e.g., an elastic, lubricating metal, e.g., lead, gold, platinum, copper, aluminum, zinc, tin or silver or alloys or TEFLON), annular spring member 52 (Belleville washer assembly), a seal shield wiper ring 55, sealshield stiffener ring 54, and seal shield extrusion ring 53.

Inner seal ring 50 is. cylindrical with an L-shaped cross section and external ribs 50b. Inner seal ring 50 engages journal bearing surface 47, counterbore surface 43, spring member 52, and wiper ring 58.

Outer seal ring 51 is cylindrical with an L-shaped cross section and internal ribs 51a. The outer seal ring 51 engages counterbore surface 43, journal bearing surface 47, and spring member 52. Annular Belleville spring members 52 have external notches 52a and internal notches 52b which slide over ribs 50b and 51a and prevent relative rotation when inner ring 50 and outer ring 51 are telescoped together (see FIGS. 4 and 5). When assembled, Belleville spring members 52 are compressed between inner ring 50 and outer ring 51.

Seal wiper ring 55 (preferably formed of a malleable material having lubricating properties and resistant to corrosion e.g., lead, gold, platinum, copper, aluminum, zinc, tin or silver or alloys or TEFLON), having a flat rectangular cross-section is positioned between outer seal ring 51 and a seal stiffener ring 54 with its inner radial surface locate against journal surface 47 and its outer radial surface located against counterbore surface 43.

Seal stiffener ring 54 (preferably formed of a rigid abrasion and corrosion-resistant, ferrous material e.g., steel or a non-ferrous material e.g., beryllium-copper, graphite or high temperature plastic) of flat rectangular cross-sectional configuration is positioned against seal wiper ring 55 with its inner radial surface located against journal surface 47 and its outer radial surface located against counterbore surface 43, and its other thrust surface against wiper ring 56.

Seal wiper ring 56 (preferably formed of a malleable material having lubricating properties and resistant to corrosion e.g., lead, gold, platinum, copper, aluminum, zinc, tin or silver or alloys or TEFLON), having a flat rectangular cross-section is positioned between stiffener rings 54 and 57 with its inner radial surface located against journal surface 47 and its outer radial surface located against counterbore surface 43.

Seal shield stiffener ring 57 (preferably formed of a rigid abrasion and corrosion-resistant, ferrous material e.g., steel or a non-ferrous material e.g., beryllium-copper, graphite or high temperature plastic) of flat rectangular cross-sectional configuration is positioned against seal wiper ring 56 with its inner radial surface located against journal surface 47 and its outer radial surface located against counterbore surface 43, and its other thrust surface against extrusion ring 53.

Extrusion ring 53 (preferably formed of a malleable material having lubricating properties and resistant to corrosion e.g., lead, gold, platinum, copper, aluminum, tin, zinc or silver or alloys or TEFLON), with a flat rectangular cross-sectional configuration, is located against stiffener ring 57 with its inner radial surface located against journal surface 47 and its outer radial surface located against counterbore surface 43 and the other axial surface against journal seal thrust face 46.

Wiper ring 58, preferably formed of a malleable material having lubricating properties and resistant to corrosion e.g., lead, gold, platinum, or silver or alloys), with a flat rectangular cross-sectional configuration, is located against spacer ring 59 (preferably formed of a rigid abrasion and corrosion-resistant material e.g., steel or a non-ferrous material e.g., beryllium-copper, graphite or high temperature plastic) with its inner radial surface located against journal surface 47 and its outer radial surface located against counterbore surface 43 and with its other thrust surface located against seal ring 50. Spacer ring 59 has a first outside diameter 60 fitting counterbore 43 and a second, smaller outside diameter 61 fitting the smaller bore 44.

Wiper rings 62, 63 and 64 preferably formed of a malleable material having lubricating properties and resistant to corrosion e.g., lead, gold, platinum, or silver or alloys), fit the smaller bore 44 and have stiffener rings 65 and 66 interspersed therebetween. Wiper ring 62 abuts the thrust face of the smaller O.D. portion 61 of spacer ring 59. Wiper ring 64 abuts one side of a second seal assembly 67 which is located in second annular seal cavity 74 and is shown in a relaxed condition prior to compression-loading. Seal and seal shield assembly 49 is effective for high temperature operation, i.e., up to 1000° F., providing sealing characteristics superior to an O-ring seal. The second seal assembly 67 comprises inner seal ring 68 of an elastic, lubricating material, outer seal ring of an elastic, lubricating material, an annular Belleville spring member 69.

Inner seal ring 68 is cylindrical with an L-shaped cross section. Inner seal ring 68 engages journal surface 47, smaller bore cutter surface 44, wiper ring 71 and Belleville spring member 69. Outer seal ring 70 is cylindrical with an L-shaped cross section and engages smaller bore surface 44, journal surface 47, wiper ring 64, and Belleville spring member 69. Wiper ring 71 abuts stiffener ring 72 which abuts extrusion ring 73 positioned against the end wall of smaller bore 44. Seal assembly 67 is effective for high temperature operation, i.e., up to 1000° F. It provides the sealing characteristics superior to an O-ring seal with chemical and temperature resistance. Belleville spring assembly 69 is shown in a compressed condition although initially it would be in the condition shown for spring 52 at the start of assembly.

The embodiment depicted in FIG. 5 is particularly useful in applications involving significant pressure differentials between the environments on the inner and outer journal surfaces. Also, this embodiment, as well as the first embodiment, is applicable to sealing a rotary shaft in structures other than rotary cone drill bits. In particular, this improved bearing seal and bearing seal shield assembly provides sealing and seal protection for rotary shafts operating in an abrasive environment, e.g., rotary drilling, boring, and grinding tools, filters, pumps, vacuum dryers, valves and the like.

SEAL AND SEAL SHIELD ASSEMBLIES FOR RECIPROCATING MEMBERS

Figure 6B:
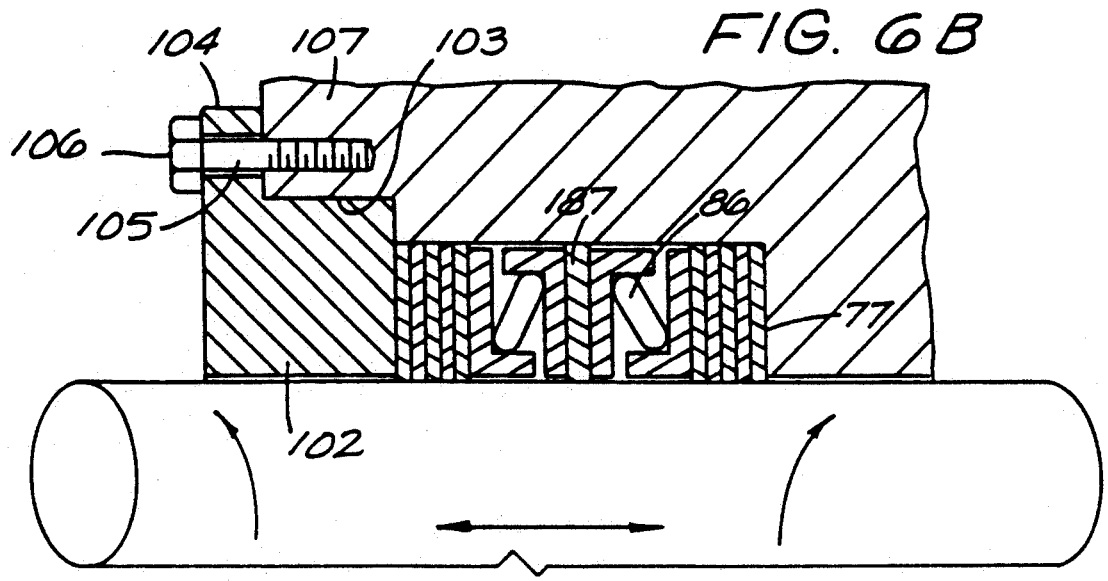
FIG. 6B is a quarter section of an embodiment of the invention having a plurality of contiguous seal assemblies arranged for sealing a static, rotating and/or reciprocating member, showing the Belleville spring assemblies prior to compression, and having a retaining member held in by machine screws.
Figure 6A:
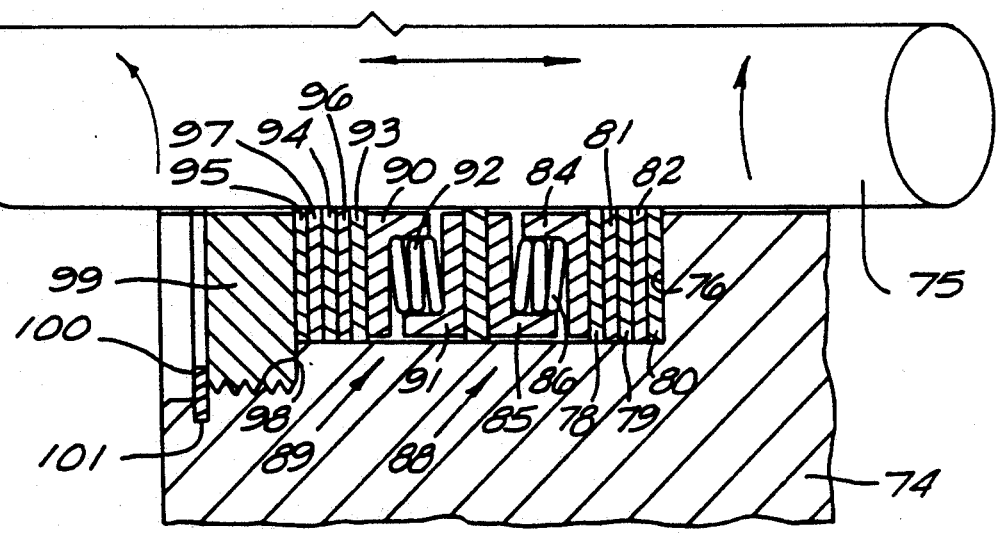
FIG. 6A is a quarter section of an embodiment of the invention having a plurality of contiguous seal assemblies arranged for sealing a static, rotating and/or reciprocating member, showing the Belleville spring assemblies after compression, and having a threaded retaining member.

In FIG. 6a, there is shown another embodiment of the invention which illustrates the installation of multiple seal and seal shield assemblies 88 and 89 in a contiguous configuration for use in sealing a reciprocating member. A journal 74 and a reciprocating member 75 are shown in quarter-sectional view. Reciprocating member 75 is cylindrical without surface irregularities.

The seal and seal shield assembly of this embodiment comprises separate seal and seal shield assemblies 88 and 89 assembled in spaced longitudinal relation between reciprocating member 75 and the journal 74 in a counterbore 76 in the journal. End wall 77 of counterbore 76 has a plurality of washers positioned thereagainst comprising wiper rings 78, 79 and 80 preferably formed of a malleable material having lubricating properties and resistant to corrosion e.g., lead, gold, platinum, copper, aluminum, tin, zinc or silver or alloys or TEFLON), and stiffener rings 81 and 82 interspersed therebetween.

The seal and seal shield assembly 88 is located in counterbore 76 against wiper ring 78 and comprises inner seal ring 84 (an elastic, lubricating metal, e.g., lead, gold, platinum, or silver or alloys), outer seal ring 85 (an elastic, lubricating metal, e.g., lead, gold, platinum, or silver or alloys), annular Belleville spring member 86, and a seal shield spacer ring 87.

Inner seal ring 84 is cylindrical with an L-shaped cross section and engages journal bearing surface 74, reciprocating member surface 75, Belleville spring member 86, and washer 78. Outer seal ring 85 is cylindrical with an L-shaped cross section. The outer seal ring 85 is cylindrical with an L-shaped cross section and engages reciprocating member surface 75, journal surface 74, spacer ring 87 and Belleville spring member 86. Annular Belleville spring member 86 is compressed between inner seal ring 84 and outer seal ring 85.

The seal and seal shield assembly 89 comprises inner seal ring 90 (an elastic, lubricating metal, e.g., lead, gold, platinum, or silver or alloys), outer seal ring 91 (an elastic, lubricating metal, e.g., lead, gold, platinum, copper, aluminum, zinc, tin or silver or alloys or TEFLON, annular Belleville spring member 92 and a seal shield spacer ring 87.

Inner seal ring 90 is cylindrical with an L-shaped cross section and engages journal bearing surface 74, reciprocating member surface 75, Belleville spring member 92, and washer 93. Outer seal ring 91 is cylindrical with an L-shaped cross section and engages journal bearing surface 74, reciprocating member surface 75, and Belleville spring member 92. A plurality of washers are positioned against inner seal ring 90 comprising wiper rings 93, 94 and 95 preferably formed of a malleable material having lubricating properties and resistant to corrosion e.g., lead, gold, platinum, copper, aluminum. zinc, tin or silver or alloys or TEFLON., and stiffener rings 96 and 97 interspersed therebetween.

Annular Belleville spring member 92 is compressed between inner seal ring surface 90 and outer seal ring 91. Seal assembly 89 is effective for high temperature operation, i.e., up to 1000° F. It provides sealing characteristics superior to an O-ring seal with chemical and temperature resistance which cannot be obtained in deformable, elastic O-ring seals).

Counterbore 76 has a further threaded counterbore 98 in which there is positioned a threaded retainer nut 99 secured against loosening by snap ring 100 in peripheral groove 101. In the embodiment of FIG. 6B, the structure in the same except that the Belleville springs 86 are single sets rather than the multiple sets shown in FIG. 6A. In addition, the seal assemblies 88 and 89 are secured in place by plug 102 in a counterbore 103. Plug 102 has a peripheral flange 104 with the shank of machine screw 105, having a hex head 106, extending into the end 107 of journal 74.

This embodiment, depicted in FIGS. 6A and 6B is particularly useful in applications involving significant pressure differentials between the environments on the inner and outer journal surfaces. This embodiment is applicable to sealing all types of reciprocating members.

ANOTHER METAL SEAL ASSEMBLY WITH BELLEVILLE SPRING

Figure 7:
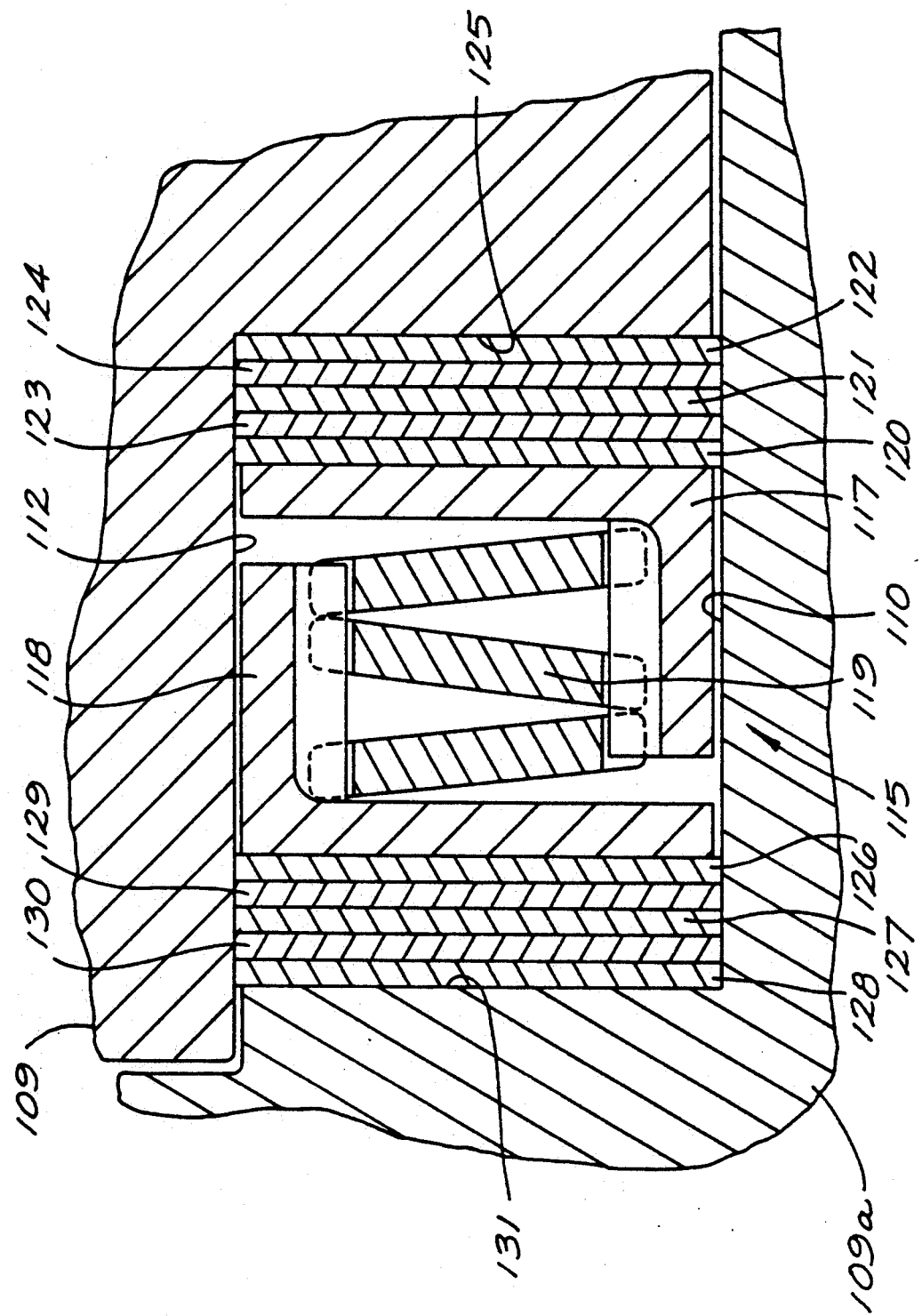
FIG. 7 is an axial sectional view of a seal assembly, with a Belleville spring assembly and extrusion rings.

In FIG. 7, there is shown a seal assembly formed entirely of metal using Belleville spring washers as the spring means for effecting the seal. The seal and seal shield assembly 115 is located in the annular seal cavity 110 to retain lubricant in the bearing area between the relatively movable members 109 and 109a and to prevent debris from entering the bearing area. The seal and seal shield assembly 115 is shown in the annular seal cavity 110 in a relaxed condition prior to compression-loading. A portion of the relatively movable members 109 and 109a rotary member 104 is depicted in close relationship to each other.

The seal and seal shield assembly 115 comprises an inner seal ring or gland 117 and an outer seal ring or gland 118, both of an elastic, malleable, lubricating metal and an annular spring assembly comprising a plurality of Belleville spring washers 119 which are notched to fit ribs on ring members 117 and 118 as in FIG. 4.

Seal ring 117 is cylindrical with an L-shaped cross section. Wiper rings 120, 121 and 122 preferably formed of a malleable material having lubricating properties and resistant to corrosion e.g., lead, gold, platinum, or silver or alloys), with stiffener rings 123 and 124 interspersed therebetween are positioned between the end face of ring 117 and end wall 125 of the relatively movable member 109. Seal ring 117 engages journal bearing surface 109a, thrust surface 125, relatively movable member 112, and Belleville spring washer 119.

Seal ring 118 is cylindrical with an L-shaped cross section. Wiper rings 126, 127 and 128 preferably formed of a malleable material having lubricating properties and resistant to corrosion e.g., lead, gold, platinum, or silver or alloys), with stiffener rings 129 and 130 interspersed therebetween are positioned between the end face of ring 118 and end wall 131 of the journal 109a. Seal ring 118 engages seal surface 112, journal surface 109a, wiper ring 126, and Belleville spring washers 119.

Belleville spring washer 119 is compressed between seal rings 117 and 118. Belleville spring washer 119 is preferably a high-temperature, corrosion-resistant, non-galling alloy. End washers 132 and 133 are a corrosion-resistant, high-strength, non-galling, wear-resistant alloy.

Seal shield stiffener rings 129 and 130 (preferably formed of a rigid abrasion and corrosion-resistant, ferrous material e.g., steel or a non-ferrous material e.g., beryllium-copper, graphite or high temperature plastic) have a flat rectangular cross-sectional configuration and are positioned between extrusion rings 126, 127 and 128 formed of a malleable material having lubricating properties and resistant to corrosion e.g., lead, gold, platinum, or silver or alloys. Lead is additionally desirable in corrosive applications as it is chemically inert and not subject to corrosion by hydrogen sulfide and other chemicals that may be encountered.

In dynamic operation, the load applied to the seal and seal shield assembly 115 deforms malleable seal shield extrusion rings, extruding portions thereof into any voids that may occur at adjacent contact surfaces. This extrusion eliminates voids at the interfaces of seal shield members and their adjacent contacted surfaces and material from the extrusion rings is slowly extruded into outer annular spaces or peripheral openings preventing the entrance of particulate matter and other foreign materials into the annular seal cavity.

As seal assembly 115 is compressed, Belleville spring washer 119 is flattened partially and exerts both longitudinal and radial pressure on seal rings 117 and 118. This results in a tight radial seal and end seal against all walls of the seal cavity and causes the aforementioned extrusion of the seal rings. This rotary and reciprocating seal assembly is effective to permit operation of the equipment as high temperatures and under high vacuum or high pressure differentials.

While this invention has been described fully and completely, with special emphasis on certain preferred embodiments, it should be understood that, within the scope of the appended claims, this invention may be practiced otherwise than as specifically described herein.

I claim:

1. A sealing assembly for a plurality of surfaces defining an annular space having a longitudinal axis, for sealing relatively movable members at temperatures up to about 1000° F., removably positionable in said space, comprising first and second annular shaped members of a hard, but elastically deformable material having low frictional properties, said annular shaped members, when fitted together, having external surfaces facing longitudinally outward relative to said longitudinal axis and external surfaces facing outward and inward radially of said longitudinal axis adapted to fit and have frictionally slidable movement relative to the surfaces of said annular space and of the relatively movable members, said annular members having surfaces facing inwardly toward each other when assembled, shaped to form an annular cavity, and annular elastic metal spring means positioned in said annular cavity between and at least partially surrounded on all sides by said annular members and spaced from the surfaces of said annular space and said relatively movable members biasing said annular members apart in directions both radially and longitudinally of said longitudinal axis when installed with said annular members under compression toward each other.

2. A sealing assembly according to claim 1 in which said elastically deformable material is selected from the group consisting of lead, gold, platinum, copper, aluminum, zinc, tin, silver and alloys thereof and PTFE and PTFE alloys.

3. A sealing assembly according to claim 1 in which one external surface of each of said annular members is planar and another surface is cylindrical.

4. A sealing assembly according to claim 1 in which said annular members are of L-shaped cross section.

5. A sealing assembly according to claim 1 in which said spring means positioned in said annular cavity has no contact with the surface of the annular space in which said annular members are positioned.

6. A sealing assembly according to claim 1 in which one external surface of each of said annular members is planar and another surface is cylindrical, and said spring means is positioned in said annular cavity and having no contact with the surfaces of the annular space in which said annular members are positioned.

7. A sealing assembly according to claim 1 in which said spring means comprises Belleville spring means.

8. A sealing assembly according to claim 6 in which said elastically deformable material is selected from the group consisting of lead, gold, platinum, copper, aluminum, zinc, tin, silver and alloys thereof and PTFE and PTFE alloys, and said spring means comprises Belleville spring means.

9. A sealing assembly according to claim 1 in which one external surface of each of said annular members is planar and another surface is cylindrical, said elastically deformable material is selected from the group consisting of lead, gold, platinum, copper, aluminum, zinc, tin, silver and alloys thereof and PTFE and PTFE alloys, and said spring means comprises Belleville spring means.

10. A sealing assembly according to claim 1 in which said spring means comprises Belleville spring means, and said spring means positioned in said annular cavity has no contact with the surfaces of the annular space in which said annular members are positioned.

11. A sealing assembly according to claim 1 in which said Belleville spring means comprises a plurality of washer members supported on said annular members inwardly facing surfaces, and a Belleville spring washer supported between at least two of said washer members.

12. A sealing assembly according to claim 1 including a flat annular disc of a soft malleable, corrosion-resistant material, extrudable under conditions of operation of said sealing assembly, and having lubricating properties, positioned adjacent to one of said annular shaped members and operable to extrude to fill spaces and surface areas during use to maintain a complete seal at high temperatures and high pressure differentials.

13. A sealing assembly according to claim 12 in which said soft malleable material is an elastically deformable metal selected from the group consisting of lead, gold, platinum, and silver and alloys thereof, and a thermoplastic material having particles of PTFE dispersed throughout.

14. A sealing assembly according to claim 12 including a flat annular stiffening disc of a hard, corrosion-resistant material positioned adjacent said soft malleable disc.

15. A sealing assembly according to claim 12 including a flat annular stiffening disc of a hard, corrosion-resistant material positioned adjacent one of said annular members.

16. A sealing assembly for a shaft assembly comprising a journal and a movable shaft member supported in said journal for relative movement therein, and having a seal cavity between said journal and movable shaft member, comprising first and second annular shaped members of a hard, but elastically deformable material having low frictional properties positioned in said seal cavity, said annular shaped members, when fitted together, having radially and axially outwardly facing external surfaces fitting the surfaces of said seal cavity and of said shaft member and journal, and inner surfaces defining a substantially enclosed inner cavity therebetween, annular elastic metal spring means positioned between and substantially enclosed by and biasing said annular members apart both radially and axially for compression against the surfaces of said seal cavity and of said shaft member and journal when installed with said annular members under compression toward each other, and means maintaining said annular shaped members under compression so that said metal spring means is effective to bias the walls of said annular shaped members into sealing relation with said seal cavity, said shaft member and journal.

17. A sealing assembly according to claim 16 in which said elastically deformable material having low frictional properties is lead, gold, platinum, copper, aluminum, zinc, tin or silver or alloys thereof or PTFE.

18. A sealing assembly according to claim 16 in which
one external surface of each of said annular members is planar and another surface is cylindrical.

19. A sealing assembly according to claim 16 in which
one external surface of each of said annular members is planar and another surface is cylindrical, and
said annular members have inwardly facing surfaces defining an annular cavity herebetween in which said spring means is positioned.

20. A sealing assembly according to claim 16 in which
said metal spring means is positioned in said inner cavity and having no contact with the surfaces of said seal cavity.

21. A sealing assembly according to claim 16 in which said spring means comprises Belleville spring means.

22. A sealing assembly according to claim 16 in which
said elastically deformable metal having low frictional properties is lead, gold, platinum, or silver or alloys thereof, and
said spring means comprises Belleville spring means.

23. A sealing assembly according to claim 16 in which
one external surface of each of said annular members is planar and another surface is cylindrical,
said elastically deformable metal having low frictional properties is lead, gold, platinum, or silver or alloys thereof, and
said spring means comprises Belleville spring means.

24. A sealing assembly according to claim 16 in which
said spring means comprises Belleville spring means,
said spring means being positioned in said inner cavity and having no contact with the surfaces of the cavity in which said annular members are positioned.

25. A sealing assembly according to claim 16 in which
said annular members have inwardly facing surfaces defining an annular cavity therebetween,
one external surface of each of said annular members is planar and another surface is cylindrical,
said spring means comprises Belleville spring means, and
said annular members are of L-shaped cross section defining an annular cavity therebetween in which said Belleville spring means is positioned.

26. A sealing assembly according to claim 16 having a plurality of sets of seal assemblies, each set constructed according to claim 16,
spacer means comprising a flat disc of a strong, rigid material positioned in said seal cavity between said respective sets of seal assemblies, and
means securing said plurality of sets of seal assemblies under compression so that the respective spring means are effective to bias the walls of said annular shaped members into sealing relation with said seal cavity.

27. A sealing assembly according to claim 26 in which
said spacer means rigid disc is iron, steel, beryllium-copper, or graphite or alloys thereof.

28. A sealing assembly according to claim 26 in which
each said annular elastic metal spring means biases said annular members both radially and axially.

29. A sealing assembly according to claim 26 in which
said elastically deformable material is selected from the group consisting of lead, gold, platinum, copper, aluminum, zinc, tin, silver and alloys thereof and PTFE and PTFE alloys, 30. A sealing assembly according to claim 26 in which
one external surface of each of said annular members is planar and another surface is cylindrical.

31. A sealing assembly according to claim 26 in which
one external surface of each of said annular members is planar and another surface is cylindrical, and
said annular members have inwardly facing surfaces defining said inner cavity therebetween in which said spring means is positioned.

32. A sealing assembly according to claim 26 in which
said annular members have inwardly facing surfaces defining said inner cavity therebetween,
said metal spring means being positioned in said annular cavity and having no contact with the surfaces of said seal cavity.

33. A sealing assembly according to claim 26 in which
said spring means comprises Belleville spring means.

34. A sealing assembly according to claim 26 in which
said elastically deformable material is selected from the group consisting of lead, gold, platinum, copper, aluminum, zinc, tin, silver and alloys thereof and PTFE and PTFE alloys, and
said spring means comprises Belleville spring means.

35. A sealing assembly according to claim 26 in which
one external surface of each of said annular members is planar and another surface is cylindrical,
said elastically deformable material having low frictional properties is lead, gold, platinum, copper, aluminum, zinc, tin or silver or alloys thereof or PTFE, and
said spring means comprises Belleville spring means.

36. A sealing assembly according to claim 26 in which
said annular members have inwardly facing surfaces defining an inner cavity therebetween,
said spring means comprises Belleville spring means,
said spring means being positioned in said annular cavity and having no contact with the surfaces of said seal cavity.

37. A sealing assembly according to claim 26 including
a flat annular disc of a soft malleable, corrosion-resistant material, extrudable under conditions of operation of said sealing assembly, and having lubricating properties, positioned adjacent to one of said annular shaped members and operable to extrude to fill spaces and surface areas during use to maintain a complete seal at high temperatures and high pressure differentials.

38. A sealing assembly according to claim 37 in which
said soft malleable material is an elastically deformable material selected from the group consisting of lead, gold, platinum, or silver and alloys thereof, and a thermoplastic material having particles of PTFE dispersed throughout.

39. A sealing assembly according to claim 37 including a flat annular stiffening disc of a hard, corrosion-resistant material positioned adjacent said soft malleable disc.

40. A sealing assembly according to claim 37 including a flat annular stiffening disc of a hard, corrosion-resistant material positioned adjacent one of said annular members.

* * * * *